United States Patent
Mejia Perez et al.

(10) Patent No.: US 10,029,625 B1
(45) Date of Patent: Jul. 24, 2018

(54) BRACKET SUPPORT STRUCTURES FOR VEHICLE TRIM PANELS, AND METHODS OF USING THE SAME

(71) Applicant: GM GLOBAL TECHNOLOGY OPERATIONS LLC, Detroit, MI (US)

(72) Inventors: Gustavo Mejia Perez, Mejia Perez (MX); Juan Sebastian Munera Medina, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/630,630

(22) Filed: Jun. 22, 2017

(51) Int. Cl.
| | |
|---|---|
| *B60R 13/00* | (2006.01) |
| *B60R 13/02* | (2006.01) |
| *B60J 5/04* | (2006.01) |
| *B60J 10/265* | (2016.01) |
| *F16B 5/06* | (2006.01) |

(52) U.S. Cl.
CPC ......... *B60R 13/0206* (2013.01); *B60J 5/0468* (2013.01); *B60J 10/265* (2016.02); *B60J 5/0416* (2013.01); *F16B 5/06* (2013.01)

(58) Field of Classification Search
CPC ........ B60R 13/0206; F16B 5/06; Y10T 24/34; Y10T 24/344; Y10T 24/3444
USPC .............................. 248/68.1, 49, 65, 73, 74.1
See application file for complete search history.

(56) References Cited

U.S. PATENT DOCUMENTS

| | | | | |
|---|---|---|---|---|
| 3,856,246 A * | 12/1974 | Sinko | ...................... | F16L 3/222 138/112 |
| 4,395,009 A * | 7/1983 | Bormke | ................... | H02G 3/32 174/157 |
| 6,561,466 B1 * | 5/2003 | Myers | ..................... | F16L 3/221 248/68.1 |
| 6,565,049 B2 * | 5/2003 | Hahn | .................. | B60R 16/0215 248/68.1 |
| 7,387,282 B2 * | 6/2008 | Kovac | ................. | B60R 16/0215 248/55 |
| 8,262,035 B2 * | 9/2012 | Bleus | .................... | F16L 3/1025 248/230.7 |
| 2003/0089829 A1 * | 5/2003 | Brandzel | ................. | F16L 3/222 248/68.1 |
| 2006/0273226 A1 * | 12/2006 | Jatzke | ..................... | F16L 3/223 248/68.1 |
| 2007/0018057 A1 * | 1/2007 | Kovac | ................. | B60R 16/0215 248/68.1 |

(Continued)

*Primary Examiner* — Dennis H Pedder
(74) *Attorney, Agent, or Firm* — Lorenz & Kopf, LLP

(57) ABSTRACT

A bracket support structure includes a first module. The first module includes an inner platform, a vehicle body insertion end extending inwardly from the inner platform, and first and second end clip portions extending outwardly from the inner platform from opposite lateral ends of the inner platform. The first and second end clip portions each include a clip fastener positioned at an outward end of the first and second end clip portions. The bracket support structure further includes a second module. The second module includes an outer platform that includes a plurality of differently sized and shaped holes for receiving a plurality of different fasteners, and first and second clip ends extending inwardly from the outer platform and configured for inserting into a respective clip fastener of the first and second end clip portions of the first module. Each of the clip ends further includes a clip fastener.

20 Claims, 8 Drawing Sheets

(56) References Cited

U.S. PATENT DOCUMENTS

2011/0303456 A1* 12/2011 Blanchard ............ F16L 3/1091
174/480

* cited by examiner

BRACKET SUPPORT STRUCTURES FOR VEHICLE TRIM PANELS, AND METHODS OF USING THE SAME

The present disclosure generally relates to vehicle systems and operations. More particularly, the present disclosure relates to bracket support structures for vehicle trim panels.

The interior trim appearance of a vehicle has been a key area of marketing focus. Interior trim components are often given treatments which provide increases in perceived value as well as brand differentiation. The current automotive interior styling trend is toward a softer, wrap-around styling vision which places special emphasis on the tactile feel of the interior, as well as the visual impression. The surface of the trim panel which is exposed to the passenger is referred to as an A-side layer. Typical materials for the A-side layer are flocking, leather, vinyl or textile materials, including cloth or carpet. While the materials used as A-side layers serve their cosmetic purposes well, none of them by themselves will they retain a shape. Accordingly, a trim substrate is provided for the necessary rigidity, and the A-side layer covers the trim substrate.

Many components—such as trim panels within vehicles as noted above—are coupled to thin-wall structures, such as those formed from sheet metal. The components may have one or more holes through which fasteners are inserted to hold the component to the sheet metal. Coupling the fastener to the sheet metal generally includes driving the fastener directly into the sheet metal at a substantially perpendicular (ninety-degree) angle.

Vehicle components may generally be formed from at least three layers or panels. An exterior body panel is often the layer viewed from the outside of the vehicle. The interior trim panel is often the layer viewed from the interior or cabin of the vehicle, and may include various design features. An outer sheet metal panel is often intermediate the exterior body panel and the interior trim panel. The outer sheet metal panel may be structural and provide the attachment points for the interior trim panel and various hardware, as noted above.

For example, FIG. 1 illustrates an outer sheet metal panel 100 (embodied as a rear compartment of a vehicle) including various different bracket support structures 111-116 that are used to affix the various trim components and hardware components to the outer sheet metal panel 100. As can be seen, bracket support structures 111-116 are provided in a variety of different independent design configurations, to provide proper support for the various different trim components and hardware components that are to be disposed over the panel 100. The use of a plurality of bracket support designs and configurations requires more tooling, more production expense, and a more complex design, which may negatively influence cost and manufacturing considerations.

Accordingly, it would be desirable to provide an improved means, such as a bracket support structure, for affixing various trim panel components and various hardware components to an intermediate vehicle panel. Additionally, it would be desirable that the bracket support structure be versatile in configuration while uniform in design so as to reduce manufacturing complexity, reduce tooling costs, and improve cross-platform utilization. Furthermore, other desirable features and characteristics of the present disclosure will become apparent from the subsequent detailed description and the appended claims, taken in conjunction with the accompanying drawings and this introductory section.

BRIEF SUMMARY

In one embodiment, a bracket support structure includes a first module. The first module includes an inner platform, a vehicle body insertion end extending inwardly from the inner platform, and first and second end clip portions extending outwardly from the inner platform from opposite lateral ends of the inner platform. The first and second end clip portions each include a clip fastener positioned at an outward end of the first and second end clip portions. The bracket support structure further includes a second module. The second module includes an outer platform that includes a plurality of differently sized and shaped holes for receiving a plurality of different fasteners, and first and second clip ends extending inwardly from the outer platform and configured for inserting into a respective clip fastener of the first and second end clip portions of the first module. Each of the first and second clip ends further includes a clip fastener positioned at an outward end of the first and second clip ends, adjacent to the outer platform.

In variations of this embodiment, the inner platform may include two harness retaining members, one being convex in configuration and the other being concave in configuration, extending outwardly from the inner platform. Each clip fastener may include a clip retainer and a clip opening configured for receiving a respective clip end. Each of the first and second clip ends may include a clip extension and a clip hook, wherein the clip extension is configured for being retained abuttingly adjacent to the clip retainer and wherein the clip hook is configured for being retained within the clip opening. In further variations, the bracket support structure may further include a fastener disposed within the outer platform of the second module. The plurality of differently sized and shaped holes of the outer platform include at least: a hole for receiving a "W-clip" fastener, a hole for receiving a "two-step" fastener, and a hole for receiving a "push-pin" fastener. In still further variations, the second module may include an inner second module, and the bracket support structure may further include an outer second module.

In another embodiment, a vehicle includes a vehicle body component, a vehicle trim component, and a bracket support structure securing and coupling the vehicle trim component to the vehicle body component. The bracket support structure includes a first module. The first module includes an inner platform, a vehicle body insertion end extending inwardly from the inner platform and into the vehicle body component, and first and second end clip portions extending outwardly from the inner platform from opposite lateral ends of the inner platform. The first and second end clip portions each include a clip fastener positioned at an outward end of the first and second end clip portions. The bracket support structure further includes a second module. The second module includes an outer platform that includes a plurality of differently sized and shaped holes for receiving a plurality of different fasteners, and first and second clip ends extending inwardly from the outer platform and inserted into a respective clip fastener of the first and second end clip portions of the first module. Each of the first and second clip ends further includes a clip fastener positioned at an outward end of the first and second clip ends, adjacent to the outer platform.

In yet another embodiment, a method for securing a vehicle trim component to a vehicle body component using a bracket support structure includes the steps of providing or obtaining a vehicle body component and inserting a first module of the bracket support structure into the vehicle body component. The first module includes an inner platform, a vehicle body insertion end extending inwardly from the inner platform and that is inserted into the vehicle body component, and first and second end clip portions extending outwardly from the inner platform from opposite lateral ends of the inner platform. The first and second end clip portions each include a clip fastener positioned at an outward end of the first and second end clip portions. The method further includes the step of coupling a second module of the bracket support structure to the first module. The second module includes an outer platform that includes a plurality of differently sized and shaped holes for receiving a plurality of different fasteners, and first and second clip ends extending inwardly from the outer platform that are inserted into a respective clip fastener of the first and second end clip portions of the first module. Each of the first and second clip ends further includes a clip fastener positioned at an outward end of the first and second clip ends, adjacent to the outer platform.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses of the disclosed bracket support structures. Furthermore, there is no intention to be bound by any theory presented in the preceding introductory section or the following detailed description.

Some vehicles utilize multiple different types and configurations of support structures, such as brackets, to couple or affix trim components and hardware components to the vehicle body, such as an intermediate sheet metal panel. Typically, each such bracket is only usable with a single trim component, or with a limited number of trim components, due to its particular size, shape, and configuration mating with the particular size, shape, and configuration of the trim component. For example, some brackets might not allow for the different spacing between trim and body that may be required. This leads to a multiplicity of brackets required for a given vehicle, little to no cross-using of brackets between vehicle platforms, increased tooling requirements, and increased complexity of assembly.

Embodiments of the present disclosure, in contrast, provide a bracket support structure that is usable across vehicle platforms for coupling or affixing different trim components to the vehicle. The bracket support structure disclosed herein is provided in two modules. The modules may be used in various combinations for different fastener or spacing requirements, particular to a given trim component. By requiring only two modules for a plurality of different applications, tooling and complexity of assembly are beneficially reduced, which may reduce vehicle manufacturing expense.

Figure 1:
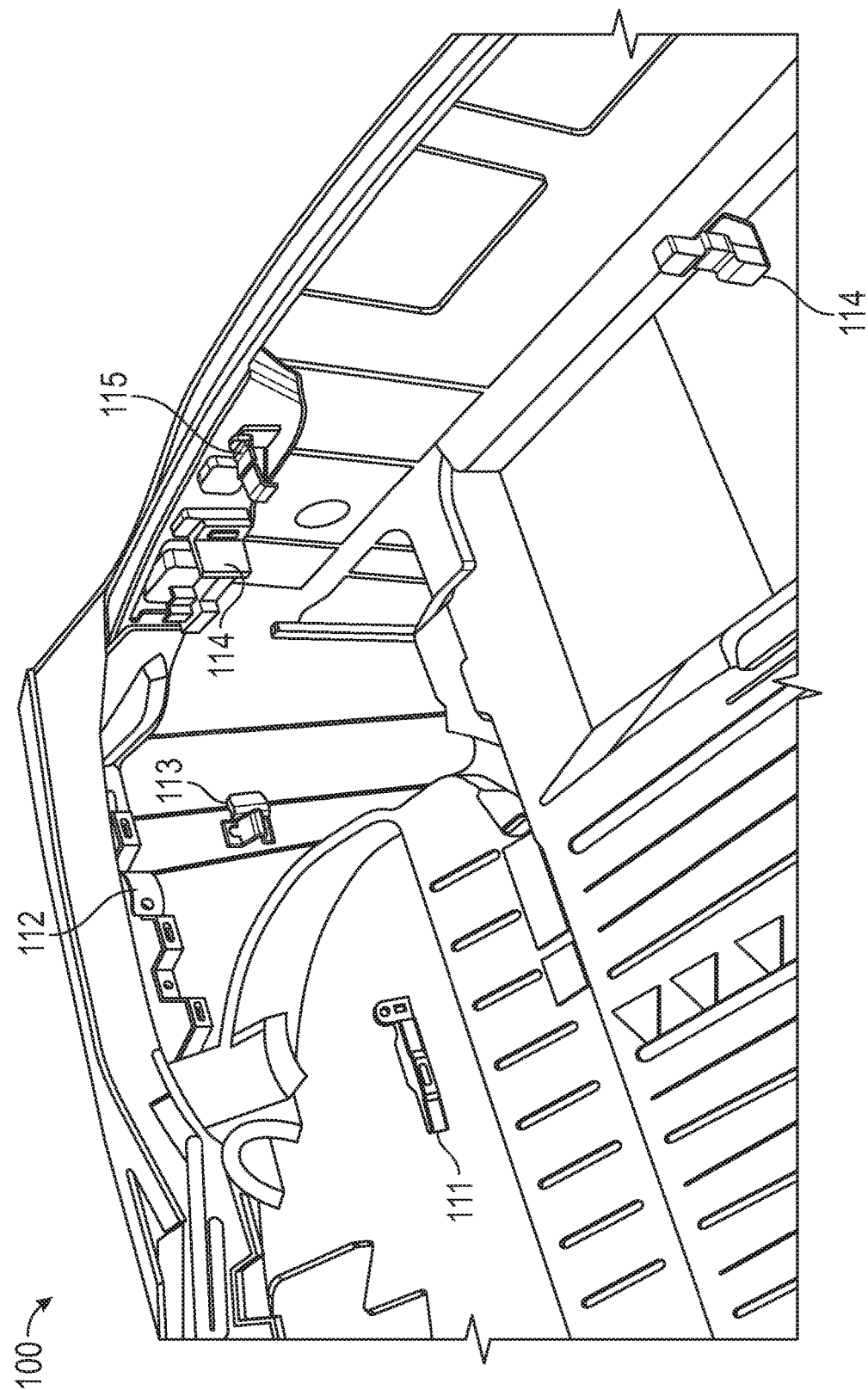
FIG. 1 is an illustration of a vehicle rear compartment including a plurality of different bracket support structures, each having a different design and configuration.
Figure 2:
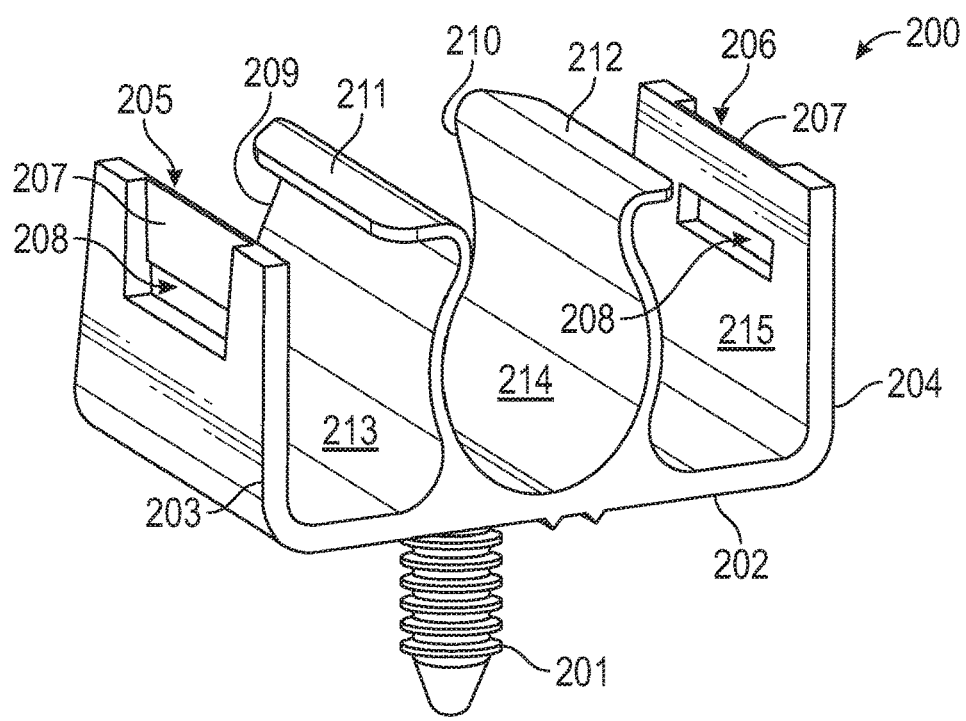
FIG. 2 is an illustration of an exemplary first module of a bracket support structure in accordance with embodiments of the present disclosure.

FIG. 2 is an illustration of an exemplary first module 200 of a bracket support structure in accordance with embodiments of the present disclosure. The first module is that portion of the bracket support structure that is in direct physical, mating contact with the vehicle body, such as the intermediate sheet metal component 100 shown in FIG. 1. The first module 200 includes a vehicle body insertion end 201, which is an extension portion that is design to be inserted into and removeably couple with the vehicle body at a particular location. Insertion end 201 may be provided as a threaded member or the like, and may likewise be configured to couple with a threaded opening of the vehicle body.

Insertion end 201 meets with an inner platform 202 of the first module 200. Inner platform 202 may be a generally planar end of the first module 200, from which insertion end 201 extends from a vehicle body-facing surface thereof. In this manner, when the insertion end 201 is inserted into the vehicle body, the body-facing surface of the inner platform 202 may be affixed generally flush against the vehicle body.

Opposite the vehicle body-facing surface of the platform 202 is a trim component-facing surface, from which extends first and second end clip portions 203, 204. The first and second end clip portions 203, 204 are provided on opposite lateral ends of the inner platform 202. First end clip portion 203 includes a first clip fastener 205 at an end opposite the inner platform 202, which includes a clip retainer 207 and a clip opening 208. Second end clip portion 204 includes a second clip fastener 206 at an end opposite the inner platform 202, which also includes a clip retainer 207 and a clip opening 208. The clip fasteners 205, 206 are design to receive a clip end of the second module, as will be discussed in greater detail below.

Further included as part of the first module 200, also extending from the trim-component-facing surface of the inner platform 202, are two harness retaining members 209, 210, which are located between the first and second end clip portions 203, 204. Harness retaining member 209 has a convex curvature (211), and harness retaining member 210 has a concave curvature (212), such configuration being provided for retaining a curved harness member (as will be discussed in greater detail below) between the two harness retaining members 209, 210. Accordingly, a space 214 is defined between the two harness retaining members 209, 210. Moreover, there is a space 213 between harness retaining member 209 and the first end clip portion 203. Still further there is a space 215 between harness retaining member 210 and the second end clop portion 204.

Figure 3:
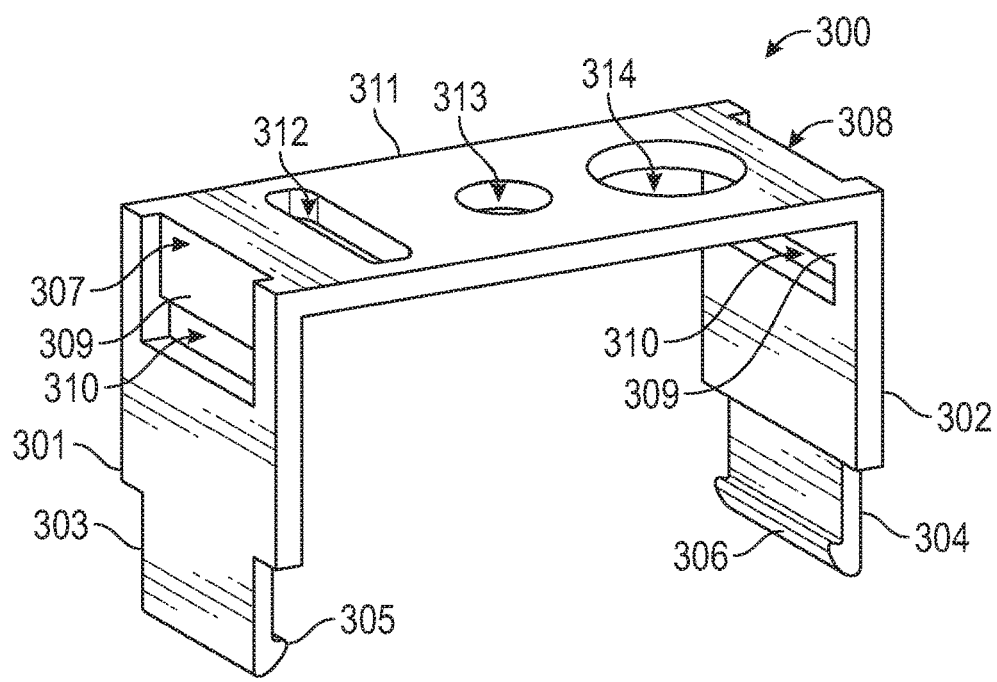
FIG. 3 is an illustration of an exemplary second module of a bracket support structure in accordance with embodiments of the present disclosure.

FIG. 3 is an illustration of an exemplary second module 300 of a bracket support structure in accordance with embodiments of the present disclosure. Second module 300 includes an outer platform 311. Outer platform 311 may generally be a planar end of the second module 300. Outer platform 311 includes a plurality of fastener openings 312, 313, 314 for receiving a plurality of different types of fasteners, which are used for fastening a trim component to the bracket support structure. In this manner, when a vehicle trim component is coupled with the bracket support structure, outer platform 311 may be affixed generally against the trim component. Openings 312-314 may be provided in a variety of shapes and sizes (oval, circular, rectangular, etc.) to receive an appropriate type of fastener, as desired. More or fewer openings 312-314 may be provided on the outer platform 311, in various embodiments.

Extending inwardly (toward the vehicle body) from the outer platform 311 are two clip ends 301, 302 of the second module 300. The distal end of clip end 301 (not connected with the platform 311) includes a clip extension 303 and a clip hook 305. The clip extension 303 is design for insertion into a clip fastener 205 of the first module 200, and remains in place therein with the clip hook 305. The distal end of clip end 302 includes a clip extension 304 and a clip hook 306. The clip extension 304 is design for insertion into a clip fastener 206 of the first module 200, and remains in place therein with the clip hook 306.

Adjacent to the outer platform 311, the clip end 301 also includes a first clip fastener 307, which includes a clip retainer 309 and clip opening 310. Furthermore, adjacent to the outer platform 311, the clip end 302 includes a second clip fastener 308, which includes a clip retainer 309 and clip opening 310. The clip fasteners 307, 308 are design to receive a clip end (301, 302) of an additional second module 300. In this manner, the second modules 200 can be stacked upon one another to provide appropriate spacing between the vehicle body and the trim component, as needed for a particular application.

Figure 4:
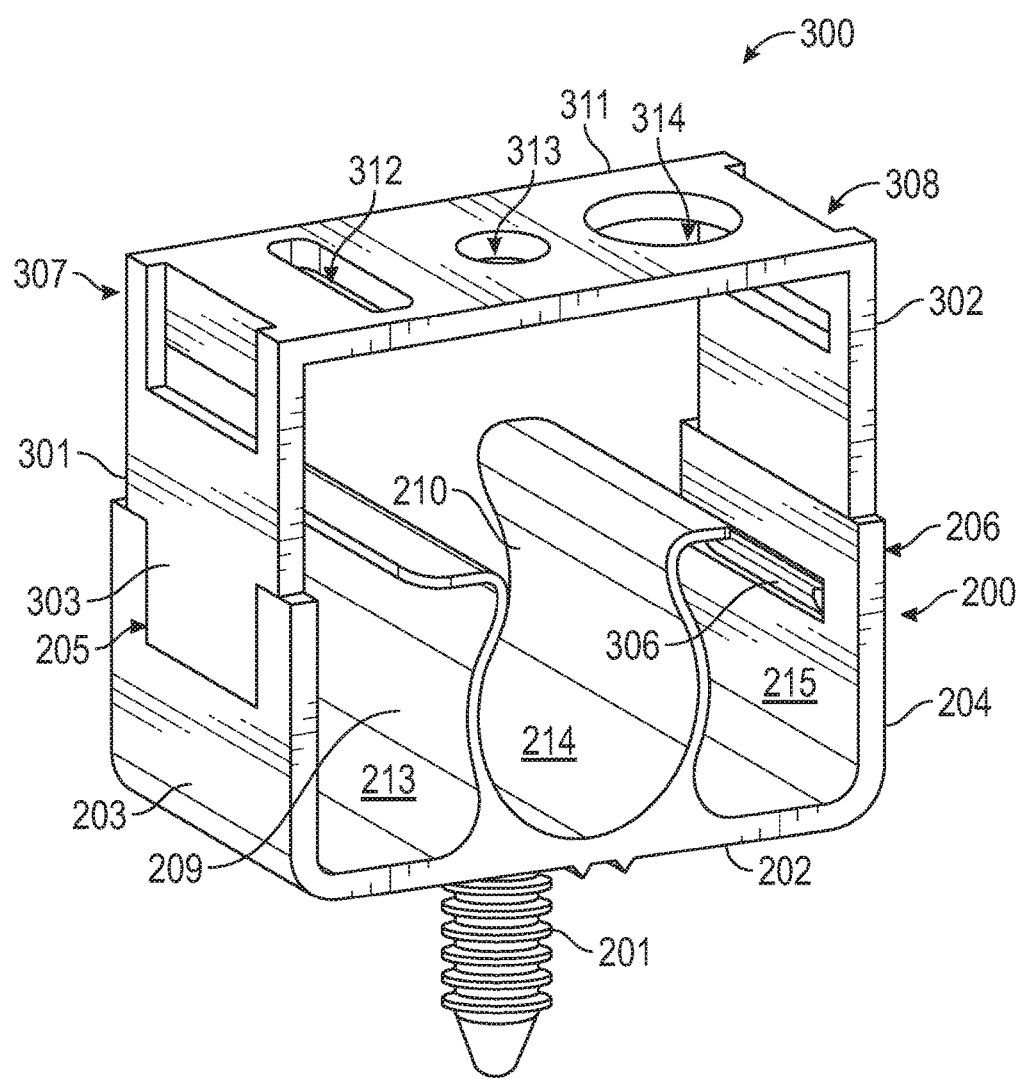
FIG. 4 illustrates the first module of FIG. 2 coupled with the second module of FIG. 3 in accordance with embodiments of the present disclosure.

FIG. 4 illustrates the first module 200 of FIG. 2 coupled with the second module 300 of FIG. 3 in accordance with embodiments of the present disclosure. As can be seen, the clip hooks 305, 306 are retained within the respective clip openings 208. Moreover, the clip extensions 303, 304 are held against the respective clip retainers 207. In this manner, a respective clip end 301, 302, is insertable and retainable against a respective first and second clip fastener 205, 206. The space between the inner platform 202, against which the vehicle body is disposed, and the outer platform 311, against which the trim component is disposed, defines a spacing between the vehicle body and the trim component.

Figure 5:
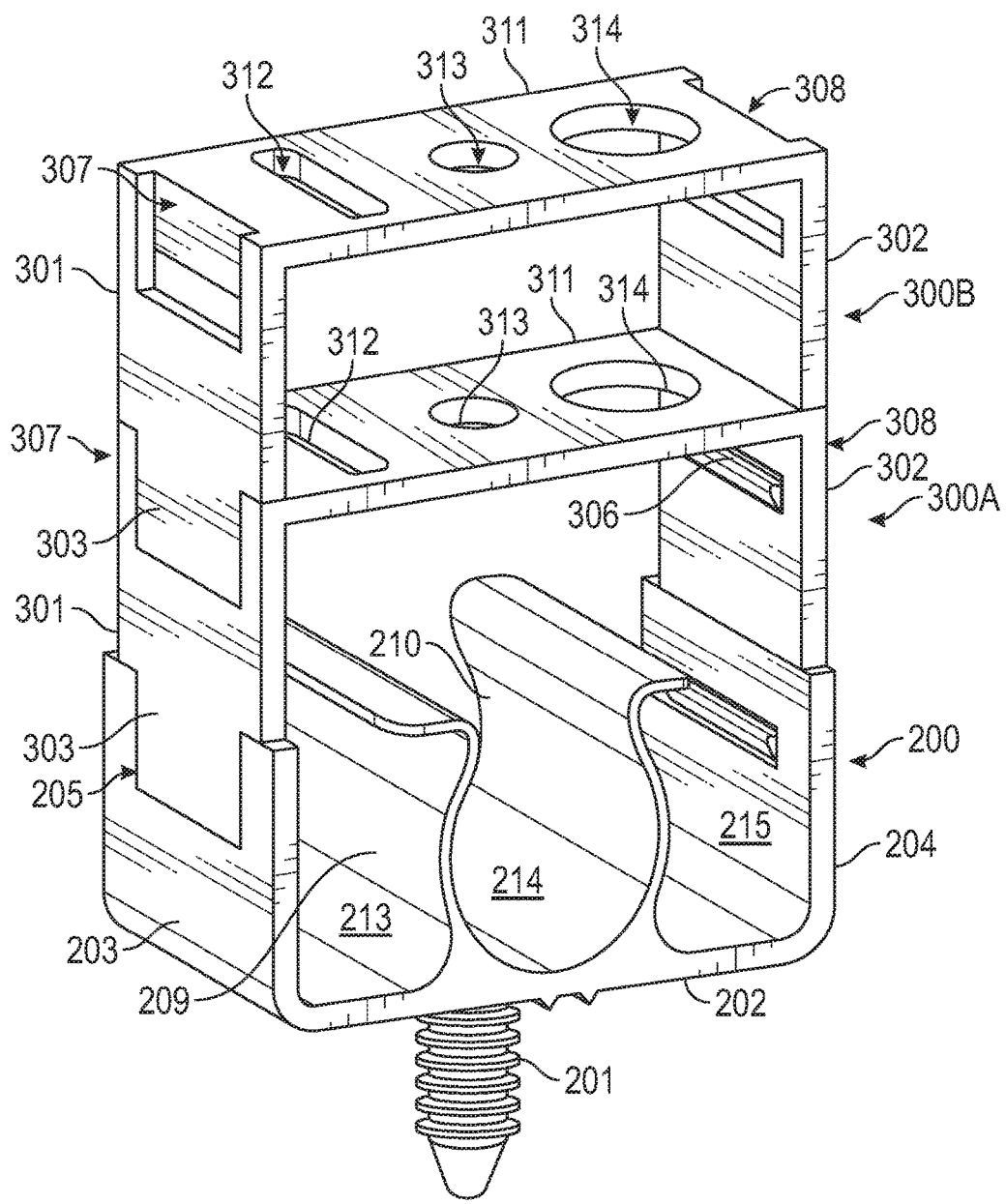
FIG. 5 illustrates the first module of FIG. 2 coupled with two of the second module of FIG. 3 in accordance with embodiments of the present disclosure.

Using the bracket support structure of the present disclosure, the spacing between the vehicle body and the trim component is adjustable. FIG. 5 illustrates the first module 200 of FIG. 2 coupled with two of the second module 300 of FIG. 3 in accordance with embodiments of the present disclosure. In addition to the previous discussion of FIG. 4, FIG. 5 discloses inner and outer second modules 300A, 300B, wherein the outer second module 300A is coupled to the inner second module 300B. As can be seen, the clip hooks 305, 306 of the outer second module 300B are retained within the respective clip openings 310 of the inner second module 300A. Moreover, the clip extensions 303, 304 of the outer second module 300B are held against the respective clip retainers 309 of the inner second module 300A. In this manner, a respective clip end 301, 302 of the outer second module 300B, is insertable and retainable against a respective first and second clip fastener 307, 308 of the inner second module 300A. The space between the inner platform 202, against which the vehicle body is disposed, and the outer platform 311 of the outer second module 300B, against which the trim component is disposed, defines a spacing between the vehicle body and the trim component. One, two, or three second modules 300 may be used in any application.

Figure 6:
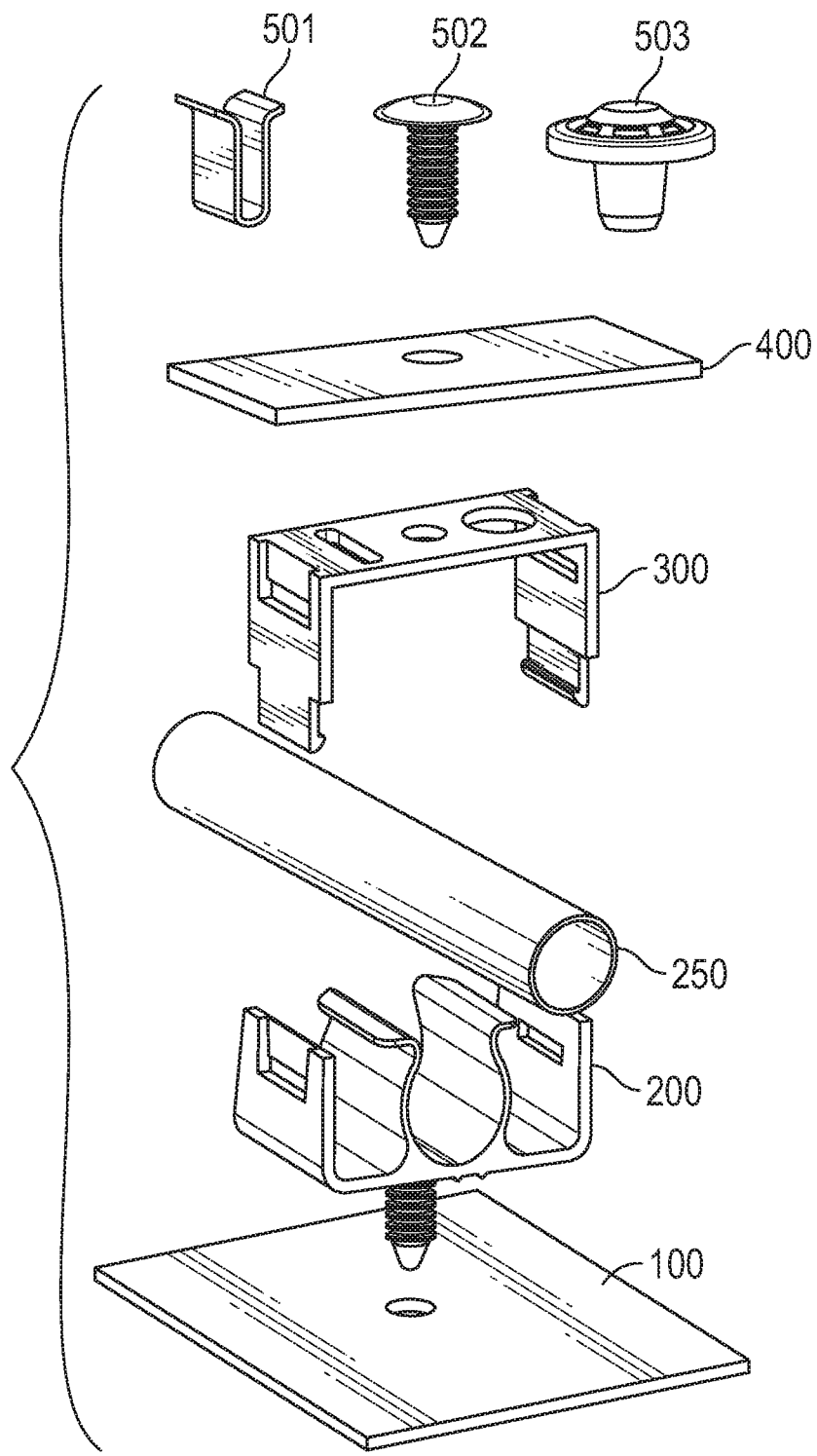
FIG. 6 illustrates a bracket support structure of the present disclosure used in connection with various fasteners for affixing a trim panel component to a vehicle body structure.

FIG. 6 illustrates a bracket support structure (200, 300) of the present disclosure used in connection with various fasteners for affixing a trim panel component to a vehicle body structure. As noted above, the outer platform 311 of the second module 300 may include a plurality of openings 312-314 for receiving various different types of fasteners. In FIG. 6, these various fasteners, 501, 502, and 503, include, for example, a "W-clip fastener" 501, a "push-pin" fastener 502, and a "two-step" fastener 503. In a practical trim component affixing application (to a vehicle body), one of the fasteners 501-503 may be inserted through a trim component 400, and then further a respective one of the openings 312-314 to be securely received therein, for coupling the trim component 400 directly and abuttingly to the platform 311 of the second module 300. The second module 300 may be received into and secured with the first module 200, as described above in FIG. 4, using the respective clip end 301, 302, being insertable and retainable against the respective first and second clip fastener 205, 206. A cylindrical harness 250, insertable and retainable between the two harness retaining members 209, 210 of the first module 200, may also be provided for further securing the bracket support (200, 300) and the trim component 400 to the vehicle body 100. Furthermore, FIG. 6 shows the insertion end 201 being inserted into the vehicle body 100, wherein the body-facing surface of the inner platform 202 may be affixed generally flush against the vehicle body 100.

Figure 7A:
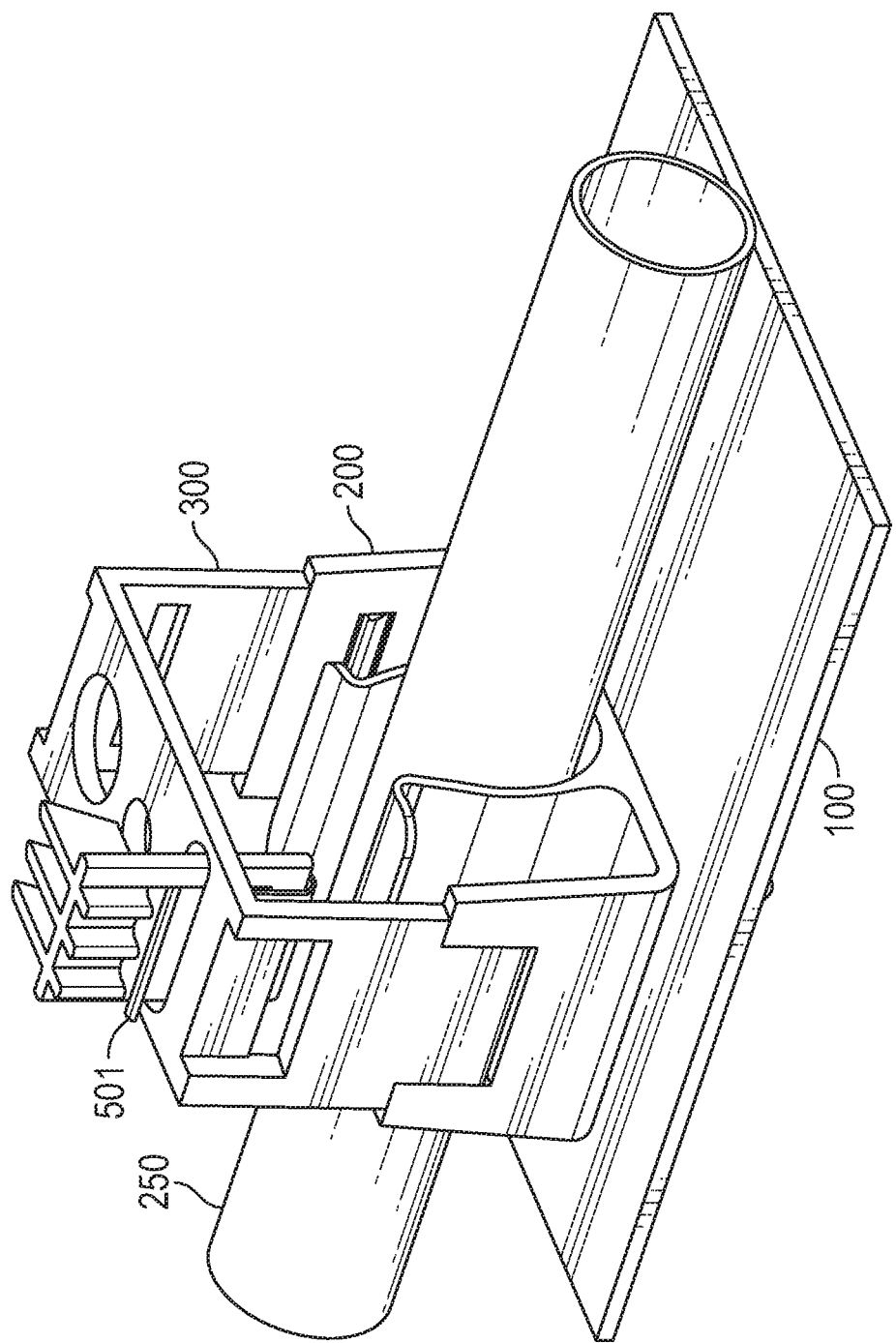
FIG. 7A illustrates a bracket support structure of the present disclosure used in connection with a "W-clip" style fastener for affixing a trim panel component to a vehicle body structure.
Figure 7B:
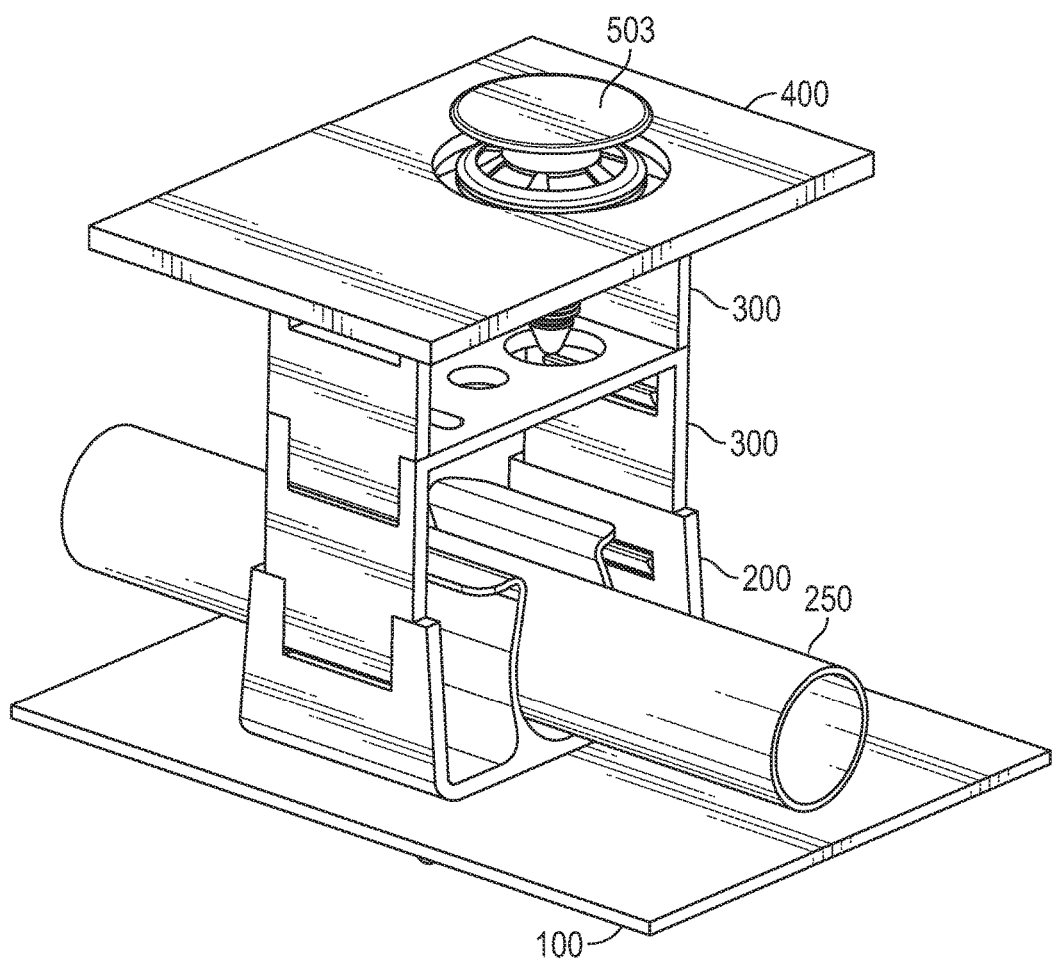
FIG. 7B illustrates a bracket support structure of the present disclosure used in connection with a "two-step" style fastener for affixing a trim panel component to a vehicle body structure.
Figure 7C:
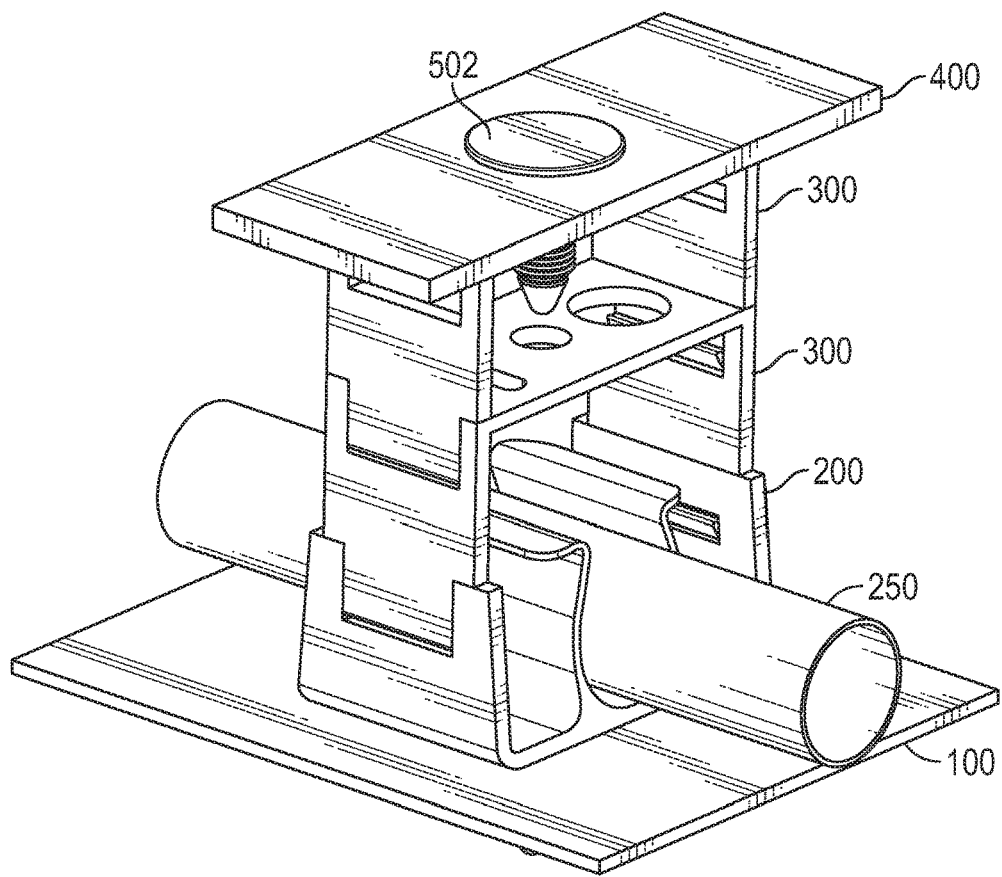
FIG. 7C illustrates a bracket support structure of the present disclosure used in connection with a "push-pin" style fastener for affixing a trim panel component to a vehicle body structure.
Figure 8:
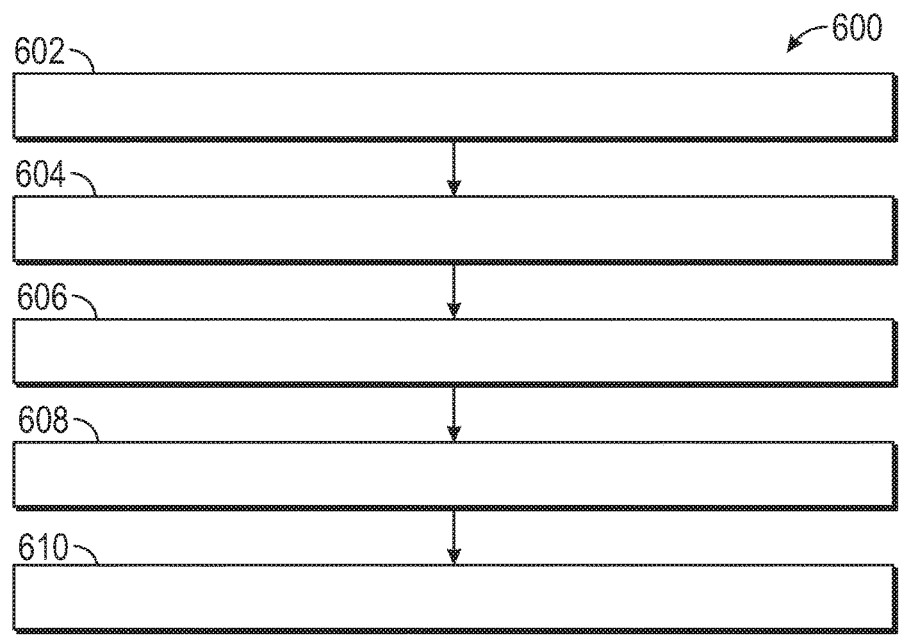
FIG. 8 is a flow chart illustrating a method for affixing a trim panel component to a vehicle body structure using a bracket support structure in accordance with embodiments of the present disclosure.

FIGS. 7A-7C illustrate fully assembled bracket support structures being used to secure a vehicle trim component 400 to a vehicle body, using the various fasteners 501-503. For example, FIG. 7A illustrates a bracket support structure (200, 300) of the present disclosure used in connection with a "W-clip" style fastener 501 for affixing a trim panel component 400 to a vehicle body structure 100. Further, FIG. 7B illustrates a bracket support structure (200, 300) of the present disclosure used in connection with a "two-step" style fastener 502 for affixing a trim panel component 400 to a vehicle body structure 100. Still further, FIG. 7C illustrates a bracket support structure (200, 300) of the present disclosure used in connection with a "push-pin" style fastener 503 for affixing a trim panel component 400 to a vehicle body structure 100.

In accordance with FIGS. 7A-7C, FIG. 8 is a flow chart illustrating a method 600 for affixing a trim panel component 400 to a vehicle body structure 100 using a bracket support structure (200, 300) in accordance with embodiments of the present disclosure. At step 602, a first module 200 of the bracket support structure is inserted within, and secured with, a vehicle body structure 100, using the insertion end 201 of the first module 200. In this manner the inner platform 202 of the first module 200 may be secured flush against the vehicle body structure 100. At step 604, a cylindrical harness 250 may be inserted and retained between the two harness retaining members 209, 210 of the first module 200. Thus, step 604 may be performed for further securing the bracket support (200, 300) and the trim component 400 to the vehicle body 100.

At step 606, a second module 300 may be received into and secured with the first module 200 using the respective clip end 301, 302, being inserted and retained against the respective first and second clip fastener 205, 206. This step provides spacing between the vehicle body 100 and the trim component 400. Optionally, at step 608, one or more additional second modules may be further provided in a stacked configuration. For example, the clip hooks 305, 306 of an outer second module 300B are inserted and retained within the respective clip openings 310 of an inner second module 300A. Moreover, the clip extensions 303, 304 of the outer second module 300B are held against the respective clip retainers 309 of the inner second module 300A. In this manner, in optional step 608, a respective clip end 301, 302 of the outer second module 300B, are inserted and retained against a respective first and second clip fastener 307, 308 of the inner second module 300A.

Furthermore, at step 610, using one of the various fasteners 501-503, such fastener may be inserted through the trim component 400, and then further a respective one of the openings 312-314 of the (outer) second module 300 to be securely received therein, for coupling the trim component 400 directly and abuttingly to the platform 311 of the (outer) second module 300. More or fewer steps may be performed in the method disclosed above. Moreover, the steps recited above may be performed in an order different than that recited above.

Accordingly, the present disclosure has provided embodiments of an improved bracket support structure, for affixing various trim panel components and various hardware components to an intermediate vehicle panel. The disclosed bracket support structure embodiments are versatile in configuration while uniform in design so as to reduce manufacturing complexity, reduce tooling costs, and improve cross-platform utilization. Moreover, the disclosed bracket support structure is capable of providing different spacing between the trim component and the vehicle body panel, and is capable of using a plurality of different fasteners to secure the trim component to the bracket.

While at least one exemplary bracket support structure embodiment has been presented in the foregoing detailed description, it should be appreciated that a vast number of variations exist. It should also be appreciated that the exemplary bracket support structure embodiment or exemplary bracket support structure embodiments are only examples, and are not intended to limit the scope, applicability, or configuration of the disclosure in any way. Rather, the foregoing detailed description will provide those skilled in the art with a convenient road map for implementing an exemplary bracket support structure embodiment of the disclosure. It is understood that various changes may be made in the function and arrangement of elements described in an exemplary bracket support structure embodiment without departing from the scope of the disclosure as set forth in the appended claims.

What is claimed is:

1. A bracket support structure comprising:
a first module, wherein the first module comprises an inner platform, a vehicle body insertion end extending inwardly from the inner platform, and first and second end clip portions extending outwardly from the inner platform from opposite lateral ends of the inner platform, wherein the first and second end clip portions each comprise a clip fastener positioned at an outward end of the first and second end clip portions; and
a second module, wherein the second module comprises an outer platform that comprises a plurality of differently sized and shaped holes for receiving a plurality of different fasteners, and first and second clip ends extending inwardly from the outer platform and configured for inserting into a respective clip fastener of the first and second end clip portions of the first module, wherein each of the first and second clip ends further comprises a clip fastener positioned at an outward end of the first and second clip ends, adjacent to the outer platform.

2. The bracket support structure of claim 1, wherein the inner platform comprises two harness retaining members, each being inwardly concave and outwardly convex in configuration, extending outwardly from the inner platform.

3. The bracket support structure of claim 1, wherein each clip fastener comprises a clip retainer and a clip opening configured for receiving a respective clip end.

4. The bracket support structure of claim 3, wherein each of the first and second clip ends comprises a clip extension the clip fastener being a clip hook, wherein the clip extension is configured for being retained abuttingly adjacent to the clip retainer and wherein the clip hook is configured for being retained within the clip opening.

5. The bracket support structure of claim 1, further comprising a fastener disposed within the outer platform of the second module.

6. The bracket support structure of claim 5, wherein the plurality of differently sized and shaped holes of the outer platform comprise at least: a hole for receiving a "W-clip" fastener, a hole for receiving a "two-step" fastener, and a hole for receiving a "push-pin" fastener.

7. The bracket support structure of claim 1, wherein the second module comprises an inner second module, and wherein the bracket support structure further comprises an outer second module.

8. A vehicle comprising:
a vehicle body component;
a vehicle trim component; and
a bracket support structure securing and coupling the vehicle trim component to the vehicle body component, wherein the bracket support structure comprises:
a first module, wherein the first module comprises an inner platform, a vehicle body insertion end extending inwardly from the inner platform and into the vehicle body component, and first and second end clip portions extending outwardly from the inner platform from opposite lateral ends of the inner platform, wherein the first and second end clip portions each comprise a clip fastener positioned at an outward end of the first and second end clip portions; and
a second module, wherein the second module comprises an outer platform that comprises a plurality of differently sized and shaped holes for receiving a plurality of different fasteners, and first and second clip ends extending inwardly from the outer platform and inserted into a respective clip fastener of the first and second end clip portions of the first module, wherein each of the first and second clip ends further comprises a clip fastener positioned at an outward end of the first and second clip ends, adjacent to the outer platform.

9. The vehicle of claim 8, wherein one of the plurality of differently sized and shaped holes has a fastener disposed therein that affixes and secures the vehicle trim component to the outer platform.

10. The vehicle of claim 8, wherein the inner platform comprises two harness retaining members, each being inwardly concave and outwardly convex in configuration, extending outwardly from the inner platform, wherein a harness is disposed and retained between the two harness retaining members.

11. The vehicle of claim 8, wherein each clip fastener comprises a clip retainer and a clip opening that receives a respective clip end.

12. The vehicle of claim 11, wherein each of the first and second clip ends comprises a clip extension, the clip fastener being a clip hook, wherein the clip extension is retained abuttingly adjacent to the clip retainer and wherein the clip hook is retained within the clip opening.

13. The vehicle of claim 8, wherein the plurality of differently sized and shaped holes of the outer platform comprise at least: a hole for receiving a "W-clip" fastener, a hole for receiving a "two-step" fastener, and a hole for receiving a "push-pin" fastener.

14. The vehicle of claim 8, wherein the second module comprises an inner second module, wherein the bracket support structure further comprises an outer second module, and wherein one of the plurality of differently sized and shaped holes of the outer second module has a fastener disposed therein that affixes and secures the vehicle trim component to the outer platform of the outer second module.

15. A method for securing a vehicle trim component to a vehicle body component using a bracket support structure, the method comprising the steps of:
   providing or obtaining a vehicle body component;
   inserting a first module of the bracket support structure into the vehicle body component, wherein the first module comprises an inner platform, a vehicle body insertion end extending inwardly from the inner platform and that is inserted into the vehicle body component, and first and second end clip portions extending outwardly from the inner platform from opposite lateral ends of the inner platform, wherein the first and second end clip portions each comprise a clip fastener positioned at an outward end of the first and second end clip portions; and
   coupling a second module of the bracket support structure to the first module, wherein the second module comprises an outer platform that comprises a plurality of differently sized and shaped holes for receiving a plurality of different fasteners, and first and second clip ends extending inwardly from the outer platform that are inserted into a respective clip fastener of the first and second end clip portions of the first module, wherein each of the first and second clip ends further comprises a clip fastener positioned at an outward end of the first and second clip ends, adjacent to the outer platform.

16. The method of claim 15, further comprising coupling a vehicle trim component to the outer support platform of the second module by passing a fastener through the vehicle trim component and through one of the plurality of differently sized and shaped holes of the outer platform.

17. The method of claim 15, wherein the inner platform comprises two harness retaining members, each being inwardly concave and outwardly convex in configuration, extending outwardly from the inner platform, wherein the method further comprises disposing and retaining a harness between the two harness retaining members.

18. The method of claim 15, wherein each clip fastener comprises a clip retainer and a clip opening, which during the step of coupling the second module, receives a respective clip end.

19. The method of claim 18, wherein each of the first and second clip ends comprises a clip extension, the clip fastener being a clip hook, wherein during the step of coupling the second module, the clip extension is retained abuttingly adjacent to the clip retainer and wherein the clip hook is retained within the clip opening.

20. The method of claim 15, wherein the second module is an inner second module, and wherein the method further comprises the steps of:
   coupling an outer second module of the bracket support structure to the inner second module; and
   coupling the vehicle trim component to the outer support platform of the outer second module by passing a fastener through the vehicle trim component and through one of a plurality of differently sized and shaped holes of the outer platform of the outer second module.

* * * * *